United States Patent
Masters et al.

(10) Patent No.: US 8,579,350 B2
(45) Date of Patent: Nov. 12, 2013

(54) MODULAR TRANSIT SYSTEM

(75) Inventors: James Masters, Henderson, NV (US); Eugene J. Germaine, Gilberts, IL (US)

(73) Assignee: Kustom Seating Unlimited, Ltd., Bellwood, IL (US)

( * ) Notice: Subject to any disclaimer, the term of this patent is extended or adjusted under 35 U.S.C. 154(b) by 260 days.

(21) Appl. No.: 12/967,959

(22) Filed: Dec. 14, 2010

(65) Prior Publication Data
US 2011/0140499 A1 Jun. 16, 2011

Related U.S. Application Data

(60) Provisional application No. 61/286,174, filed on Dec. 14, 2009.

(51) Int. Cl.
*B60N 2/02* (2006.01)

(52) U.S. Cl.
USPC .......................................... 296/64; 297/340

(58) Field of Classification Search
USPC ............ 296/63, 64, 69, 19, 24.38, 65.03, 67; 297/440.14, 220.21, 440.1, 452.1, 297/463.01
See application file for complete search history.

(56) References Cited

U.S. PATENT DOCUMENTS

| | | | |
|---|---|---|---|
| 3,600,033 A | 8/1971 | Holdampf et al. | |
| 4,167,285 A * | 9/1979 | Fenner et al. | 296/178 |
| 4,584,603 A | 4/1986 | Harrison | |
| 4,723,732 A | 2/1988 | Gorges | |
| 4,784,425 A | 11/1988 | Bateman | |
| 4,936,620 A | 6/1990 | Francois et al. | |
| 4,964,671 A | 10/1990 | Millar | |
| 5,236,153 A | 8/1993 | LaConte | |
| 5,267,775 A | 12/1993 | Nguyen | |
| 5,716,026 A | 2/1998 | Pascasio et al. | |
| 5,839,787 A * | 11/1998 | Magnuson et al. | 297/452.2 |
| 6,068,232 A * | 5/2000 | Bentley | 248/503.1 |
| 6,260,813 B1 | 7/2001 | Whitcomb | |
| 6,416,116 B1 | 7/2002 | Stanton et al. | |
| 6,565,152 B2 | 5/2003 | Craft et al. | |
| 6,568,735 B1 * | 5/2003 | Lohr et al. | 296/63 |
| 7,100,885 B2 | 9/2006 | Zerner | |
| 7,281,685 B2 | 10/2007 | Schoene | |
| 7,434,877 B2 | 10/2008 | Herold, III et al. | |
| 7,472,951 B2 | 1/2009 | Herold, III et al. | |
| 7,597,395 B2 * | 10/2009 | Wiedeman et al. | 297/248 |
| 8,251,455 B1 * | 8/2012 | Midkiff et al. | 297/463.1 |
| 2008/0164711 A1 | 7/2008 | Zambon et al. | |
| 2012/0169108 A1* | 7/2012 | Kammler | 297/452.39 |

FOREIGN PATENT DOCUMENTS

DE 3118427 A1 * 11/1982

* cited by examiner

*Primary Examiner* — Glenn Dayoan
*Assistant Examiner* — Pinel Romain
(74) *Attorney, Agent, or Firm* — McCracken & Frank LLC

(57) ABSTRACT

The present disclosure provides a modular transit system having a track system and/or modular seating that can be used to modify a transit car. The track system can support a variety of attachments to allow the transit car to be reconfigured. According to one embodiment of the present invention, an adjustable furnishing system is de-mountably mountable to a generally vertical wall. The adjustable furnishing system comprises a mounting structure carried by the wall, a support frame having opposite first and second ends, and a furnishing carried by the support frame. The first end of the support frame releasably attaches to the mounting structure and the mounting structure supports the support frame in a cantilevered position with the second end extending outwardly from the wall with the furnishing carried thereon.

11 Claims, 7 Drawing Sheets

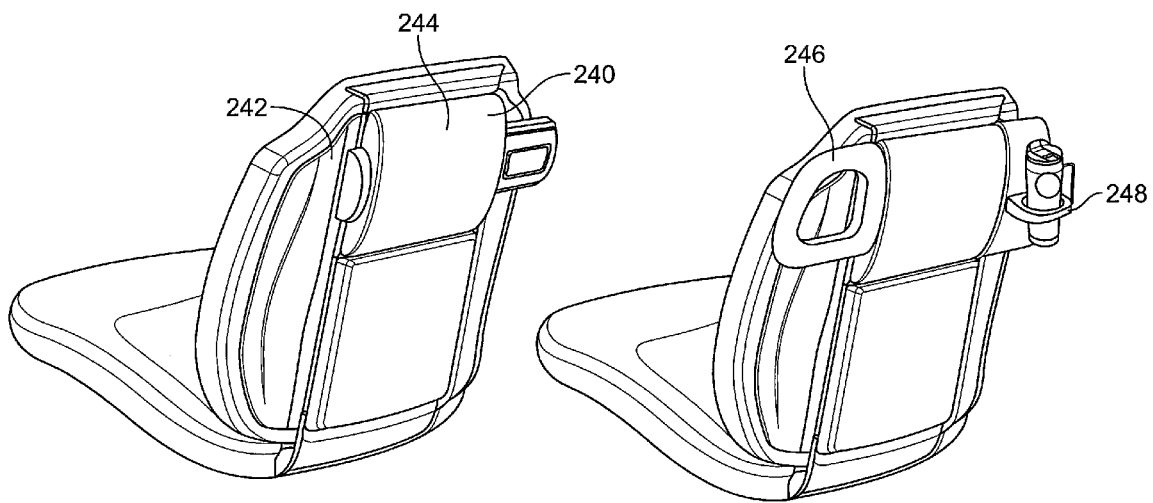
FIG. 4　　　　　　FIG. 5

MODULAR TRANSIT SYSTEM

CROSS REFERENCE TO RELATED APPLICATIONS

This patent application claims the benefit of U.S. Provisional Application No. 61/286,174, filed Dec. 14, 2009, the contents of which are incorporated herein by reference.

REFERENCE REGARDING FEDERALLY SPONSORED RESEARCH OR DEVELOPMENT

Not applicable

SEQUENTIAL LISTING

Not applicable

BACKGROUND OF THE DISCLOSURE

1. Field of the Disclosure

The present disclosure relates generally to a modular transit system, and more particularly, to a modular transit system having a seating system that includes various interchangeable parts.

2. Description of the Background of the Disclosure

Development of seating systems in mass transit have traditionally involved a company pre-selecting a desired seating configuration and permanently installing the pre-selected configuration into a transit car or multiple transit cars. The procurement, design, implementation, and manufacturing process may take many years to complete so a company must plan ahead for the types of configurations that the company desires. If a company wishes to deviate from the pre-selected selections, the company must re-order the seating system and/or re-configure the car interior. Either of these options are extremely cost prohibitive.

The traditional seating systems suffer from many disadvantages. For example, once a transit car is designed and manufactured, the configuration of seating is limited to the original design. Still further, the transit company may have special ordered some unique configurations, but the transit car configurations are limited.

SUMMARY OF THE INVENTION

The present invention provides a modular transit system having a track system and/or modular seating that can be used to modify a transit car. The track system can support a variety of attachments to allow the transit car to be reconfigured.

According to one embodiment of the present invention, an adjustable furnishing system is de-mountably mountable to a generally vertical wall. The adjustable furnishing system comprises a mounting structure carried by the wall, a support frame having opposite first and second ends, and a furnishing carried by the support frame. The first end of the support frame releasably attaches to the mounting structure and the mounting structure supports the support frame in a cantilevered position with the second end extending outwardly from the wall with the furnishing carried thereon.

According to another embodiment of the present invention, a modular seat assembly is comprised of an elongate support spine extending longitudinally from a first end to a second end. A seat portion is connected to a front side of the support spine, and each of the seat portion and the support spine includes one of a complementary pair of interlocking portions. Additionally, the interlocking portion of the seat portion slides onto the interlocking portion of the support spine over the first end. The modular seat assembly further includes an end cap lockably disposed over the first end that prevents the seat portion from sliding off the support spine.

According to still another embodiment of the present invention, a method of assembling a modular seating system, including a seat portion attachable to a support spine, is disclosed. The method comprises the step of releasably attaching the seat portion to the support spine by sliding a projection of one along a channel of the other from one end of the support spine, wherein the projection interlocks with the channel. The method further comprises the step of locking an end cap over the end of the support spine to prevent the seat portion from dissembling from the support spine.

BRIEF DESCRIPTION OF THE DRAWINGS

FIG. 4 is a rear isometric view of the modular seat of FIG. 3 having a first implement;

FIG. 5 is a rear isometric view of the modular seat of FIG. 3 having second and third implements;

Other aspects and advantages of the present disclosure will become apparent upon consideration of the following detailed description, wherein similar structures have like or similar reference numerals.

DETAILED DESCRIPTION

The present disclosure is directed to a modular transit system and may be embodied in many different forms. Several specific embodiments are discussed herein with the understanding that the present disclosure is to be considered only as an exemplification of the principles of the disclosure, and it is not intended to limit the disclosure to the embodiments illustrated.

Figure 1:
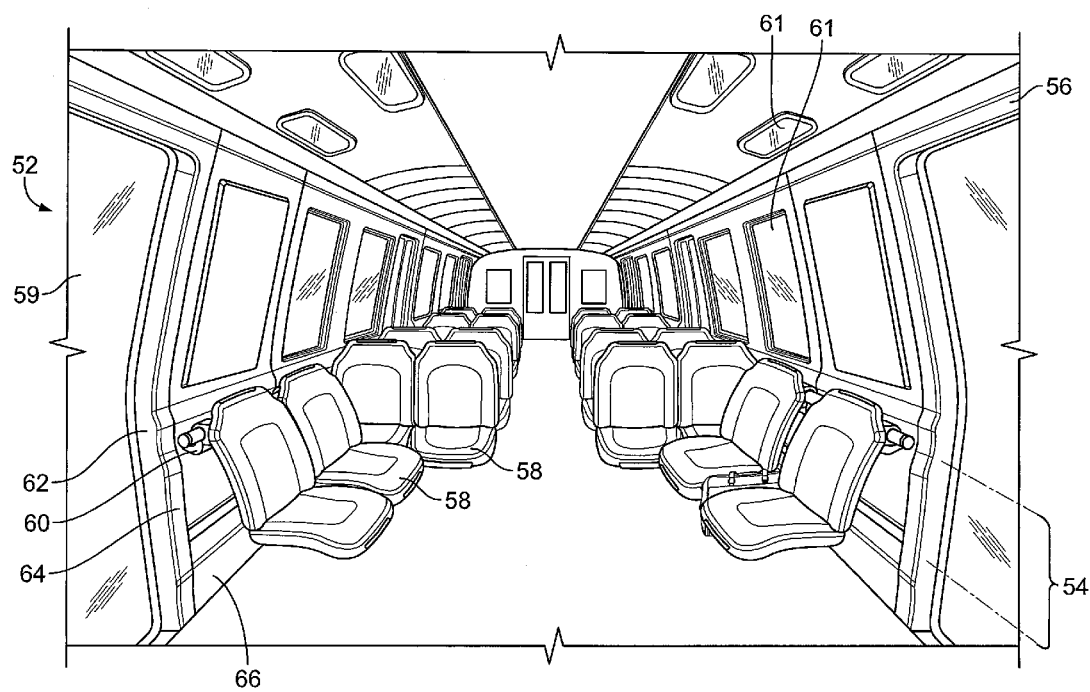
FIG. 1 is a schematic of a transit car having a track system and a plurality of modular seats attached to the track system.
Figure 2:
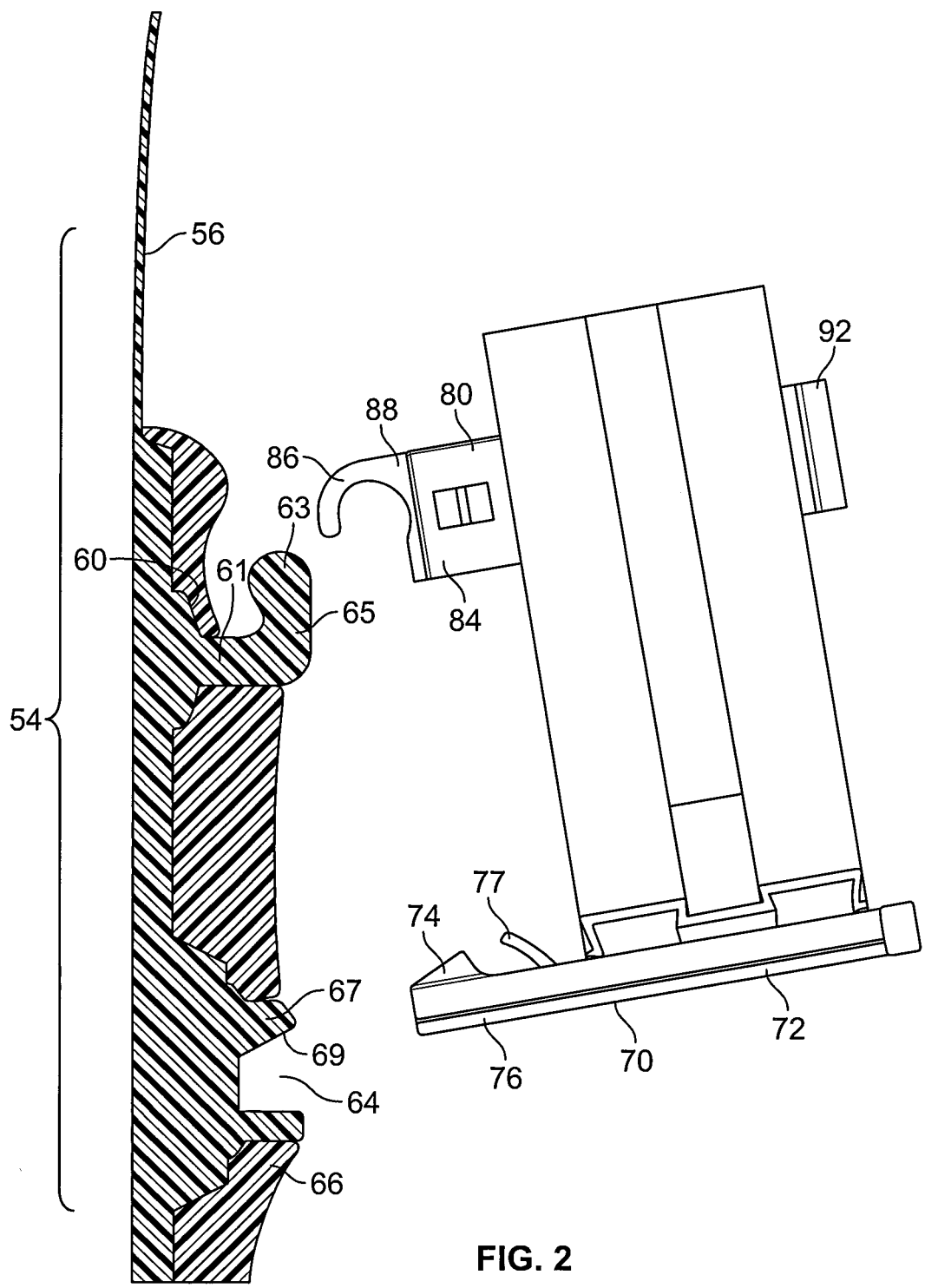
FIG. 2 is partial cross-sectional view of the track system of FIG. 1 taken generally along the lines of 2-2 of FIG. 1 and having a center spine and struts attached thereto, with the seat portions and features removed therefrom for clarity.

Referring to the drawings, FIG. 1 depicts a transit system that includes an elongate transit car 52, a track system 54 attached to a wall 56 of the transit car 52, and a plurality of modular seats 58 attached to and extending outwardly from the track system 54. The transit car 52 includes doors 59 and windows 53 disposed along a length thereof that are of a kind known in the art. As shown in FIG. 2, the track system 54 includes a first channel 60 having a grab bar 61 extending outwardly therefrom. The grab bar 61 includes a bulbous hook 63 extending upwardly from an end 65 of the grab bar 61. The grab bar 61 generally extends outwardly from a medial portion 62 of the wall 56 of the transit car 52. A locking mechanism (not shown) may be included in an interior section of the grab bar 61 such that other components are able to interlock with the grab bar 61. If a seat 58 is not attached to the track system 54, the grab bar 61 and more specifically, the bulbous hook 63, may be utilized to provide an additional surface for a user to grab onto during transit.

Any type of locking mechanism known in the art may be utilized including locking mechanisms that allow modular seats and/or attachments to be attached and detached therefrom.

Still referring to FIG. 2, a channel 64 is disposed in a surface 67 in a bottom section 66 of the transit car 52 located adjacent the grab bar 61. The channel 64 may include an attachment component, such as a recess (not shown), in a top surface 69 thereof that is adapted to interact with a support member in the form of a strut 70. The strut 70 is comprised of an elongate base member 72 that includes an upwardly extending notch 74 at a first end 76 thereof. The strut 70 further includes two upwardly extending protrusions 78a, 78b that are adapted to interact with the modular seats 58 as described in more detail hereinbelow. The notch 74 is preferably angled and sized to correspond to the channel 67 such that the strut 70 can be aligned with and may be inserted into the channel 67 to secure the strut 70 to the track system 54 disposed on the wall 56 of the transit car 52. The strut 70 includes a latch 77 that extends upwardly from the base member 72 and is adapted to help secure the strut 70 to the wall 56. The latch 77 can be rotated from a first, unlocked position to a second, locked position, once the strut 70 is inserted into the channel 67. The strut 70 further includes an end cap or strut cap 73 (FIG. 3) disposed at an end 75 thereof that provides aesthetic benefits as well as having the capability to accept implements as described in more detail below.

Figure 3:
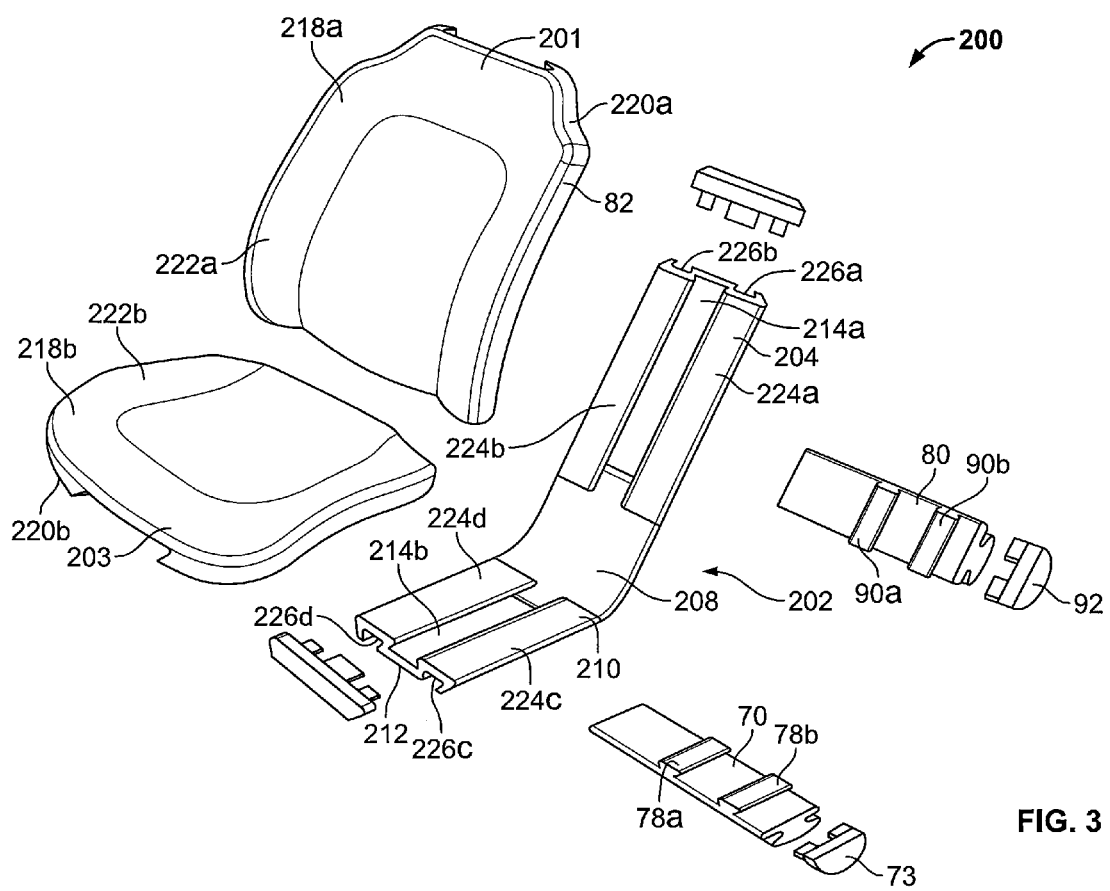
FIG. 3 is an exploded isometric view of a modular seat of FIG. 1.

Still referring to FIGS. 2 and 3, a secondary strut 80 is used to provide structural reinforcement and to secure a top portion 82 of the modular seat 58 to the track system 54 attached to the wall 56 of the transit car 52. The secondary strut 80 includes a latch 83 extending from a front side 84 of the strut 80 that helps secure and lock the strut 80 to the wall 56. The secondary strut 80 further includes a hook member 86 extending from an end 88 thereof that is adapted to lock into the bulbous hook 63 of the grab bar 61. As shown in FIG. 3, the secondary strut 80 includes two upwardly extending triangular protrusions 90a, 90b, that are adapted to interact with the modular seats 58 as described in more detail hereinbelow. The secondary strut 80 may further include a strut cap 92 that locks into the secondary strut 80 at a second end 94 to provide aesthetic benefits as well as having the capability to accept implements as described in more detail below.

Although the track system 54, including the grab bar 61 and the channel 64 are depicted as integral with the wall 56 of the transit car 52, any of the track system 54 components may be installed as separate parts that are attached to an outside surface of the wall 56. Further, latches 77, 83 may be utilized to secure the struts 70, 80 to the track system 54 and/or other locking mechanisms may be used as known in the art such as, for example, lock and key. It is preferable that the latches 77, 83 are positioned such the seat 58 covers the latches 77, 83 when the seat 58 is attached to the struts 70, 80. The hidden latches 77, 83 prevent unauthorized persons from accessing and unlocking the struts 70, 80.

A modular seat 200, as best seen in FIG. 3, may be used with the track system 54 disclosed previously herein, or may be used with other track systems as known in the art. The modular seat 200 includes a first generally vertical seat portion 201, a second generally horizontal seat portion 203, and a center support spine 202 having an upper section 204 and a lower section 206 connected by a bent portion 208 and adapted to support the first and second seat portions 201, 203, respectively. The vertical seat portion 201 and horizontal seat portion 203 may be seat cushions. The center spine 202 includes a plurality of tracks disposed in a front surface 210 and rear surface 212 thereof. The front surface 210 includes an upper channel 214a and a lower channel 214b disposed in a central portion therein, wherein each channel 214a, 214b comprises a triangular cross sectional profile adapted to receive complementary shaped protrusions (not shown) that extend outwardly along all or a portion of sections 218a, 218b of the seat 200. The protrusions 216a, 216b are preferably disposed on bottom surfaces 220a, 220b of the seat 200 so that top surfaces 222a, 222b of the seat 200 are outwardly facing when the seat 200 is attached to the center spine 202. Raised portions 224a, 224b, 224c, 224d, extend outwardly from the upper and lower channels 214a, 214b, respectively, and include channels 226a, 226b, 226c, 226d disposed on back sides thereof. The channels 226a, 226b, 226c, 226d are adapted to receive the protrusions 78a, 78b, 90a, 90b, respectively, that extend upwardly from struts 70, 80, as previously discussed herein. The channels and protrusions may be any shape and size so long as the protrusions can be moved along and retained in the channels to releasably secure the seat portions or other attachments to the center support spine 202 in an interlocking connection.

In use, when securing the modular seat 200 to the spine 202, the first seat portion 201 is slid downwardly onto the spine 202 such that the protrusion 216a slides into the channel 214a. The first seat portion 201 is slid downwardly until an edge (not shown) of the protrusion 216a hits a ridge 217a that extends into the channel 214a from the bent portion 208 of the center spine 202. Once the first seat portion 201 is in place, a spine cap 219a is inserted into channels 226a, 226b to lock the first seat portion 201 into place. Similarly, the second seat portion 203 is slid laterally onto the spine 202 such that the protrusion 216b slides into the channel 214b. The second seat portion 203 is slid laterally until an edge (not shown) of the protrusion 216b hits a ridge 217b that extends into the channel 214b from the bent portion 208 of the center spine 202. Once the second seat portion 203 is in place, a spine cap 219b is inserted into channels 226c, 226d to lock the second seat portion 203 into place. The spine caps 219a, 219b may be secured using an interference fit with the channels 226a, 226b, 226c, 226d, or may utilize other securement methods so long as the first and second seat portions 201, 203 are firmly locked into place when the spine caps 219a, 291b are disposed in the channels 226a, 226b, 226c, 226d and such that the spine caps 219a, 219b can be releasably removed if it is desired to remove the first and second seat portions 201, 203 from the center spine 202.

The first and second seat portions 201, 203 are preferably shaped to the contour of the user's body and are preferably two separate parts, such that each seat portion 201, 203 can be exchanged independently of the other portion 201, 203. The seat portions 201, 203 may be made of any material known in the art including, for example, vinyl, plastic, cloth, and the like. The first portion 201 may be manufactured from one type of material and the second portion 203 may be manufactured from a second type of material, or both materials may be the same. The seat portions 201, 203 may also be formed in other styles, configurations, and/or contours as desired.

As shown in FIGS. 4 and 5, the first seat portion 201 may include a variety of implements disposed on a back side 242 thereof. The implements are preferably releasably attached to any and/or all of the strut caps 73, 92 and/or spine caps 219a, 219b utilizing protrusions and channels as described previously herein or using other securement methods as known in the art. A first implement 240, in the form of a crash pad 244, is shown in FIGS. 4 and 5. The crash pad 244 is preferably made of a soft material that may help absorb forces during an accident. A second implement in the form of a grip handle 246 is depicted in FIG. 5. A third implement in the form of a cup holder 248 is also depicted in FIG. 5. It is also contemplated that other implements may also be used, such as, for example, head rests, electronic or printed advertisement displays, a coat hook, a cell phone charger, an audio dock, stanchion mounts (shown in FIG. 6), leg/footrests, and the like. Any of the implements may be used alone or in combination with each other. Further, the implements may be permanently secured to the modular seat 200 or may be releasably attached.

Figure 6:
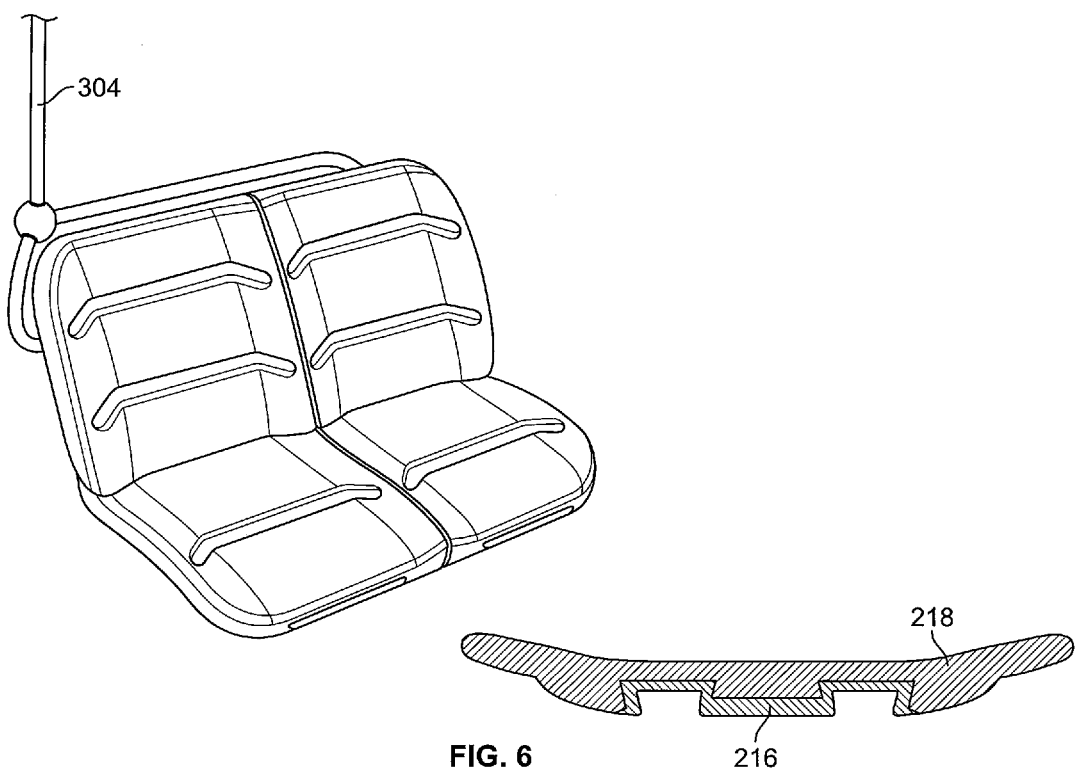
FIG. 6 is a front isometric view of a modular seat having a plurality of seats.

The modular seat 200 may comprise a single modular seat 58 configuration as depicted in FIGS. 3, 4, and 5, or may include a plurality of modular seats 302 as shown in FIG. 6. The single modular seat configuration 58 utilizes the center spine 202 and struts 70, 80 disclosed previously herein to support the modular seat 58. In some embodiments, the center spine 202 alone or in combination with one or both of the struts 70, 80 may comprise a support frame to support the modular seat 50. The plurality of modular seats 302 utilize longer struts (not shown) attached to the bottom and backs of the seats to attach the seats to the wall 56 of the transit car 52 in the same manner as described hereinabove. An additional support member 304, shown in FIG. 6, may be releaseably attached on one end to the center spine (not shown) of the seat 58 and may be releasably attached on the other end to the transit car 52. Other support members may be utilized with the modular seat(s) that provide support and/or attachment capabilities to the transit car 52.

The single modular seat 58 configuration and/or plurality of modular seats 302 may be oriented in a transverse direction as designated by 400 in FIG. 1, or may be oriented in a center-facing direction as designated by 402, also shown in FIG. 1. Any combination of a single modular seat or plurality of modular seats in transverse and/or center-facing directions may be used in the transit car 52 as disclosed herein.

Figure 7:
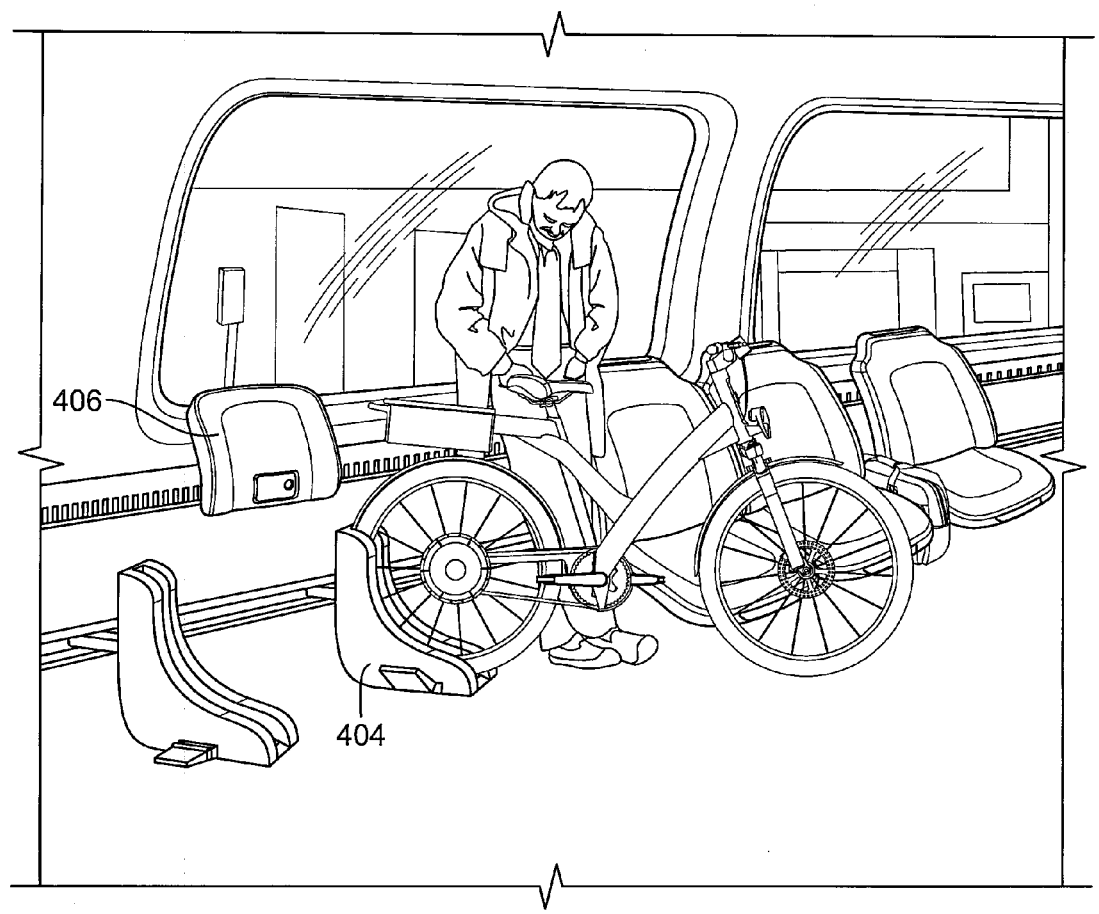
FIG. 7 is a schematic of transit car having a track system and a plurality of attachments attached thereto.
Figure 8:
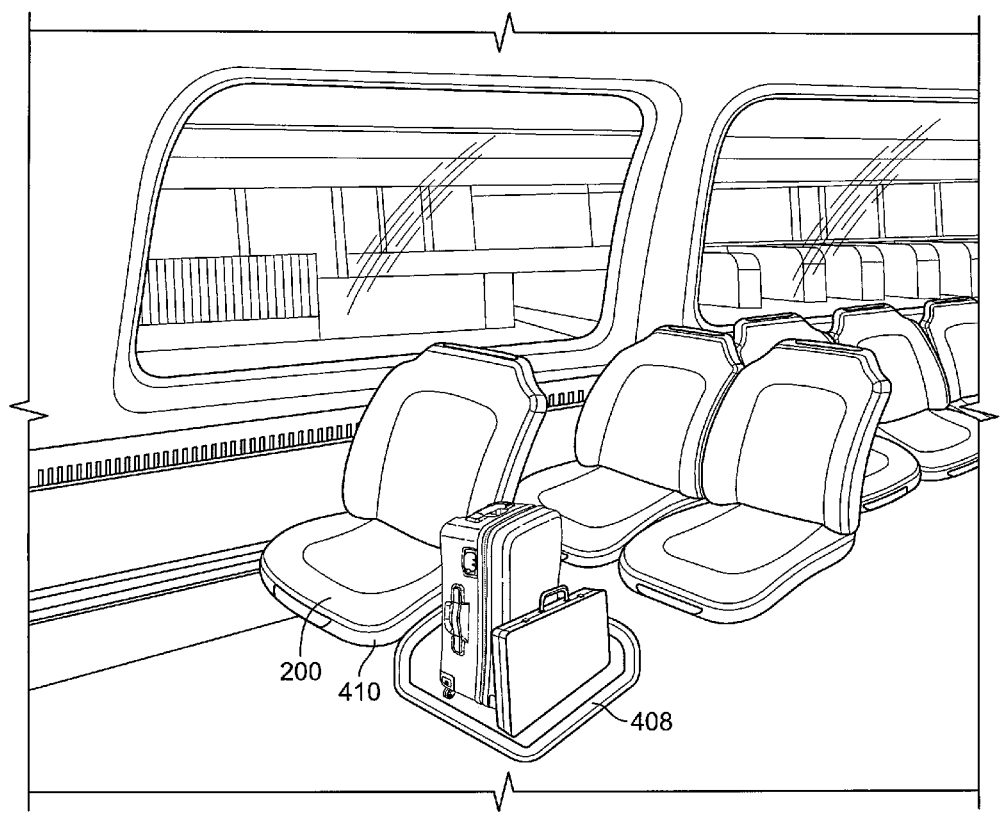
FIG. 8 is a schematic of transit car having a modular seat with an attachment attached thereto.

Turning to FIGS. 7 and 8, other attachments may be used with the track system 54 in conjunction with and/or instead of the modular seats 200. For example, an attachment in the form of a bicycle boot 404 is attached to the channel 64 disposed on the wall 56. Any mechanisms known in the art may be used to releasably secure the boot 404 to the wall 58. Another attachment in the form of a lean pad 406 is also depicted in FIG. 7. The lean pad 406 is attached to the grab bar 61 using a hook member (not shown) disposed on a back side of the lean pad 406 that is adapted to latch onto the bulbous hook 63 of the grab bar 61. Any of the attachments may also be attached to either the channel 64 and/or the grab bar 61 utilizing methods known in the art or methods disclosed herein.

Referring to FIG. 8, an attachment may be used in conjunction with and/or may be releasably attached to the modular seat 200. For example, an attachment in the form of a luggage rack 408 is attached to a side 410 of the modular seat 200. The luggage rack 408 may be attached to the seat 200 utilizing the strut system disclosed previously herein or may be attached using other methods as known in the art.

In all of the methodologies disclosed herein, it is contemplated that many of the parts are releasably attached to each other to allow for the transit car 52 to be easily reconfigured. Further, the track system 54 disclosed herein may be used with the modular seat 200 described herein or may be adapted to be used with other seating systems as known in the art. The modular seat 200 disclosed herein may be used in conjunction with the track system 54 disclosed herein or may be used independently in other seating systems as known in the art. Further, although a transit car 52 is disclosed, it is contemplated that the track system 54 and/or modular seating 200 could be used in other settings including a concert venue, a stadium, a boat, and/or other locations that utilize various seating arrangements.

Any of the embodiments described herein may be modified to include any of the structures or methodologies disclosed in connection with other embodiments.

INDUSTRIAL APPLICABILITY

The present disclosure provides a modular transit system having a track system and/or modular seating that can be used to modify a transit car. The track system can support a variety of attachments to allow the transit car to be reconfigured.

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out same. The exclusive rights to all modifications which come within the scope of the appended claims are reserved.

We claim:

1. An adjustable furnishing system that is de-mountably mountable to a generally vertical wall comprising:
    a mounting structure carried by the wall, wherein the mounting structure comprises a channel;
    a support frame having a strut and opposite first and second ends; and
    a seat carried by the support frame;
    wherein securing the strut into the channel releasably attaches the first end of the support frame to the mounting structure and the mounting structure supports the support frame in a cantilevered position with the second end extending outwardly from the wall with the seat carried thereon.

2. The furnishing system of claim 1, wherein the mounting structure comprises a support member projecting outwardly from the wall, and the strut comprises a receiver disposed at the first end thereof, wherein the support member is releasably received in the receiver.

3. The furnishing system of claim 2, further comprising a locking mechanism that releasably locks the strut to the mounting structure.

4. An adjustable furnishing system that is de-mountably mountable to a generally vertical wall comprising:
    a mounting structure carried by the wall;
    a support frame having opposite first and second ends;
    a furnishing carried by the support frame;
    wherein the furnishing comprises a seat for sitting;
    wherein the mounting structure comprises a support member projecting outwardly from the wall, and the support frame comprises a first strut comprising a receiver disposed at the first end thereof, wherein the support member is releasably received in the receiver;
    wherein the first end of the support frame releasably attaches to the mounting structure and the mounting structure supports the support frame in a cantilevered position with the second end extending outwardly from the wall with the furnishing carried thereon; and
    wherein the mounting structure further comprises a first attachment component adjacent the wall and spaced below the support member, and the support frame further comprises a second strut spaced below the first strut, wherein a first end of the second strut is releasably attached to the first attachment component.

5. The furnishing system of claim 4, further comprising a first locking mechanism that releasably locks the support member to the first strut, and a second locking mechanism that releasably locks the second strut to the first attachment component.

6. The furnishing system of claim 4, wherein the support member comprises a rail spaced from the wall, and the receiver comprises a hook member that hooks over the rail.

7. The furnishing system of claim 6, wherein the first attachment component comprises a channel, the rail and the channel are substantially parallel to each other and the wall, and the support frame can be adjusted to a plurality of positions along the channel and the rail.

8. The furnishing system of claim 7, wherein the support frame can be adjusted to any of an infinite number of positions along the channel and the rail.

9. The furnishing system of claim 4, wherein the first strut and the second strut project outwardly from the wall and are substantially parallel and spaced apart, wherein the support frame further comprises a spine member rigidly connecting the first strut to the second strut.

10. The furnishing system of claim 9, wherein the seat is releasably connected to the spine member.

11. The furnishing system of claim 10, wherein the seat is oriented to face transverse to the first and second struts.

* * * * *